United States Patent
Botelho

(10) Patent No.: US 10,114,845 B2
(45) Date of Patent: *Oct. 30, 2018

(54) EFFICIENTLY ESTIMATING COMPRESSION RATIO IN A DEDUPLICATING FILE SYSTEM

(71) Applicant: EMC Corporation, Hopkinton, MA (US)

(72) Inventor: Fabiano Botelho, Sunnyvale, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/677,822

(22) Filed: Apr. 2, 2015

(65) Prior Publication Data

US 2015/0363438 A1 Dec. 17, 2015

Related U.S. Application Data

(63) Continuation of application No. 13/334,499, filed on Dec. 22, 2011, now Pat. No. 9,026,752.

(51) Int. Cl.
*G06F 13/00* (2006.01)
*G06F 17/30* (2006.01)
*G06F 11/14* (2006.01)
*G06F 11/20* (2006.01)

(52) U.S. Cl.
CPC .... *G06F 17/30303* (2013.01); *G06F 11/1456* (2013.01); *G06F 11/2074* (2013.01); *G06F 17/30156* (2013.01)

(58) Field of Classification Search
CPC .......... G06F 17/30; G06F 15/16; G06F 13/00; G06F 12/00
See application file for complete search history.

(56) References Cited

U.S. PATENT DOCUMENTS

| | | | |
|---|---|---|---|
| 8,065,309 B1 * | 11/2011 | Bar-Yossef | G06F 17/30979 707/747 |
| 2007/0005556 A1 * | 1/2007 | Ganti | G06F 17/30575 |
| 2009/0192980 A1 * | 7/2009 | Beyer | G06F 17/30469 |
| 2010/0125559 A1 * | 5/2010 | Hadjieleftheriou | G06F 17/30469 707/706 |

(Continued)

OTHER PUBLICATIONS

"Distinct-Values Estimation over Data Streams" written by Phillip B. Gibbons, http://www.pittsburgh.intel-research.net/people/gibbons/papers/distinct-values-chapter.pdf, captured by WaybackMachine, Oct. 18, 2007.*

(Continued)

*Primary Examiner* — Charles Rones
*Assistant Examiner* — Han Doan
(74) *Attorney, Agent, or Firm* — Womble Bond Dickinson (US) LLP

(57) ABSTRACT

A system for estimating a quantity of unique identifiers comprises a processor and a memory. The processor is configured to, for each of k times, associate a bin of a set of bins with each received identifier. The processor is further configured to determine an estimate of the quantity of unique identifiers based at least in part on an average minimum associated bin value. The memory is coupled to the processor and configured to provide the processor with instructions.

23 Claims, 6 Drawing Sheets

(56) References Cited

U.S. PATENT DOCUMENTS

| | | | | |
|---|---|---|---|---|
| 2010/0257315 | A1* | 10/2010 | Zhu | G06F 3/0608 |
| | | | | 711/118 |
| 2010/0333116 | A1* | 12/2010 | Prahlad | G06F 17/3002 |
| | | | | 719/328 |
| 2011/0051805 | A1* | 3/2011 | Van Splunter | H04N 19/00339 |
| | | | | 375/240.03 |
| 2012/0084287 | A1* | 4/2012 | Lakshminarayan | |
| | | | | G06F 17/30536 |
| | | | | 707/737 |
| 2012/0246726 | A1* | 9/2012 | Kind | H04L 63/1416 |
| | | | | 726/23 |
| 2013/0091102 | A1* | 4/2013 | Nayak | G06F 3/0613 |
| | | | | 707/692 |

OTHER PUBLICATIONS

"Distinct-Values Estimation over Data Streams" written by Phillip B. Gibbons, https://www.cs.cmu.edu/~gibbons/Phillip%20B.%20Gibbons_files/Distinct-Values-Estimation-over-Data-Streams-PBGibbons.pdf, captured by WaybackMachine, Oct. 18, 2007.*

* cited by examiner

EFFICIENTLY ESTIMATING COMPRESSION RATIO IN A DEDUPLICATING FILE SYSTEM

CROSS REFERENCE TO OTHER APPLICATIONS

This application is a continuation of co-pending U.S. patent application Ser. No. 13/334,499, entitled EFFICIENTLY ESTIMATING COMPRESSION RATIO IN A DEDUPLICATING FILE SYSTEM filed Dec. 22, 2011 which is incorporated herein by reference for all purposes.

BACKGROUND OF THE INVENTION

As the computing power of modern devices grows, more and more data is generated and must be stored. Some data storage systems include both a primary data storage system and a backup data storage system, to reduce the overall chance of data loss. Usually the primary storage is backed up multiple times and therefore the backup storage capacity has to be greater or equal to the primary storage capacity. This can be considered an inefficient use of resources. One technique that has been used to reduce the total data storage capacity necessary for a backup storage system is data deduplication. Data deduplicating systems recognize repeated segments of data and store only a single copy of each segment, greatly reducing storage when similar files are stored. In some circumstances, it is advantageous to determine the required storage capacity for a deduplicating backup system, or whether a deduplicating backup will fit in a given storage device, before the backup is created.

BRIEF DESCRIPTION OF THE DRAWINGS

Various embodiments of the invention are disclosed in the following detailed description and the accompanying drawings.

DETAILED DESCRIPTION

Figure 1:
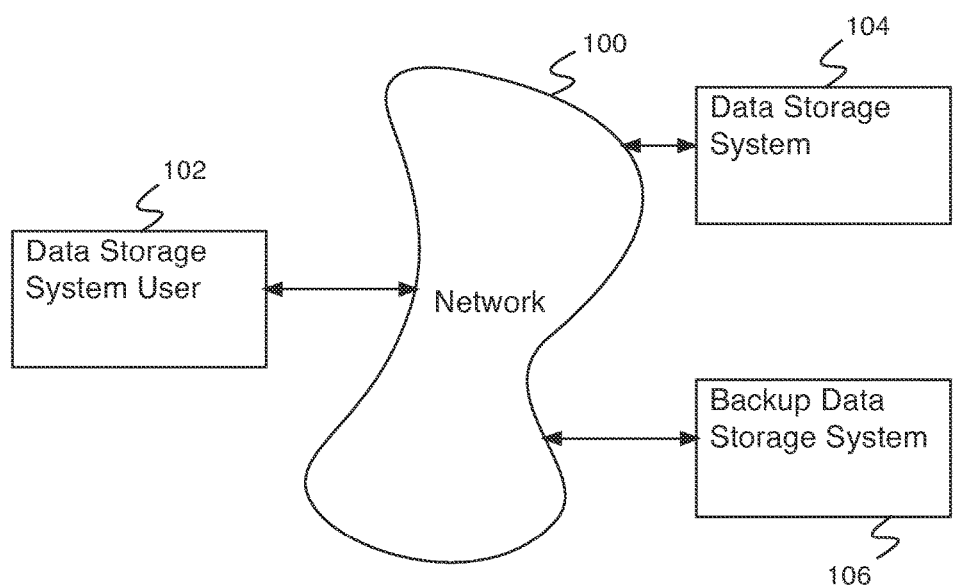
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Efficiently estimating compression ratio in a deduplicating file system is disclosed. In some embodiments, estimating a compression ratio comprises estimating a quantity of unique identifiers. A system for estimating a quantity of unique identifiers comprises a processor and a memory. The processor is configured to, for each of k times, associate a bin of a set of bins with each received identifier. The processor is further configured to determine an estimate of the quantity of unique identifiers based at least in part on an average minimum associated bin value. The memory is coupled to the processor and configured to provide the processor with instructions.

In some embodiments, a compression ratio for a deduplicating file system is estimated by calculating a set of data segment identifiers for a set of data segments and estimating the fraction of unique data segment identifiers. A repeated data segment identifier indicates a repeated segment, which can be discarded by the deduplicating system. The ratio of unique data segment identifiers to total data segment identifiers is equal to the compression ratio achieved by the deduplicating system. For a very large set of data segment identifiers, keeping track of the total number of unique data segment identifiers exactly is a very demanding task, both in terms of total processing necessary and total memory usage, as a list of unique data segment identifiers must be recorded and checked for each new data segment identifier. A more efficient way of estimating the total number of unique data segment identifiers is possible using randomizing hash functions. A randomizing hash function maps a data block (e.g., a data segment identifier) to one of a set of data bins (e.g., a value 1 . . . M, where M is 10, 100, 1000, or any other appropriate number) in such a way that its statistics are that of a uniformly distributed random variable. In the example shown, the number of data bins must be larger than the number of unique data segment identifiers, so the total number of data segment identifiers is used. When a randomizing hash function is applied to the total set of data segment identifiers, the outputs fall into a number of data bins equal to the number of unique data segment identifiers. Counting the number of data bins where a hash has fallen can still be prohibitively large when making an estimate for a large filesystem, however. To determine the number of unique data segment identifiers, the minimum bin value for the hash function is tracked over the set of data segment identifiers.

In some embodiments, when a number N random variables are uniformly distributed within an interval, the random variable with the minimum value of the N random variables is on average 1/(N+1) through the interval. For instance, one random variable uniformly distributed from 0 to 1 has an average value of ½; the minimum of two random variables uniformly distributed from 0 to 1 has an average value of ⅓; the minimum of three random variables uniformly distributed from 0 to 1 has an average value of ¼, etc. The minimum value of a set of random variables is thus representative of the number of random variables in the set, if enough averaging is performed. By tracking the minimum bin value for a randomized hash function on the set of data segment identifiers and averaging the minimum bin value over a large set of hash functions, a good estimate can be made for the number of random variables generated, equal to the number of unique data segment identifiers (e.g., two identical data segment identifiers always hash to the same value and only generate a single random variable). For each hash function, only the current minimum value need be stored, and over the set of hash functions, only the running average need be stored, thus this computation can be performed very efficiently.

In some embodiments, a hash function h: {f: f is a fingerprint}->{1, . . . , m}, which carries out a uniform mapping. From the set of fingerprints there are n unique fingerprints. If uniformly at random n points are selected in an interval, it is expected that if you do this many times, the n points should divide the interval up into (n+1) roughly evenly-sized subintervals. So, the smallest point x is roughly m/(n+1) of the entire interval. Therefore the number of unique fingerprints can be estimated using n=m/x−1. By using k hash functions to come up with k samples to estimate the minimum, if these are averaged by the Theory of Large Numbers or Central limit theorem, a standard error is arrived at of 1/sqrt(k). The standard error metric is defined as stddev(n)/n', where stddev(n) is the standard deviation of the estimate of n assuming a uniform distribution (this would be roughly n) and n' is the true number of unique elements (e.g., the one you would count precisely)

In some embodiments, estimating a compression ratio for a deduplicating file system comprises receiving a data set, dividing the data set into a set of data segments, processing the set of data segments to create a set of data segment identifiers, and determining the number of unique data segment identifiers. In some embodiments, determining the number of unique data segment identifiers comprises, for each of k randomized hash functions, processing each of the data segment identifiers with the hash function and determining the minimum value produced by the hash function over the set of data segment identifiers, and averaging the set of minimum values. In the example shown, the number of unique data segment identifiers is then determined to be the number of possible outputs of the hash functions divided by the average minimum value of the hash functions, minus one. The compression ratio is determined to be the number of unique data segment identifiers divided by the total number of data segment identifiers.

In some embodiments, using this technique it can be estimated whether a given set of files that is being migrated from an active collection partition would fit into a target collection partition. For example, for a storage system that is currently using an active partition to store data that would like to move some or all of the data to a target collection partition (e.g., to take the partition off line for archiving). In various embodiments, the technique is used to estimate a compression ratio for a given stream of segments as if it was being backed up to an empty system or to estimate how much compression you would get considering that the deduplicating data system already has some data in it. In some embodiments, a data structure is maintained within a deduplicating data system and updated by the stream of segments as the segments enter the deduplicating data system.

FIG. 1 is a block diagram illustrating an embodiment of a network system. In the example shown, the network system comprises data storage system user 102, data storage system 104, and backup data storage system 106, communicating via network 100. In various embodiments, network 100 comprises one or more of the following: a local area network, a wide area network, a wired network, a wireless network, the Internet, or any other appropriate network. Data storage system user 102 comprises a data storage system user accessing data storage services on data storage system 104. In some embodiments, data storage system 102 comprises a user who uses a user interface (e.g., a keyboard, a touch screen, a display, etc.) to interact with data storage system 102. In various embodiments, the user interface is associated with a desktop computer, a laptop computer, a local terminal, or any other appropriate system with a user interface. In some embodiments, data storage system user 102 comprises an employee at a company utilizing a data storage system. In some embodiments, data storage user 102 comprises an employee at a company purchasing data storage system services. In various embodiments, there are 1, 2, 4, 13, 22, 115, or any other appropriate number of database system users accessing data storage services on data storage system 104. In some embodiments, each data storage system user only has access to their own data stored on data storage system 104 and is able to utilize data storage system 104 as though they are the sole data storage system user.

Data storage system 104 comprises a data storage system for storage and retrieval of information. In some embodiments, data storage system 104 comprises a distributed data storage system, e.g., a data storage system comprising multiple computers not necessarily in the same location. In some embodiments, data storage system 104 comprises a system for processing information. In some embodiments, data storage system 104 comprises a storage system optimized to efficiently store uncompressed files. In some embodiments, data storage system 104 comprises a deduplicating storage system. Backup data storage system 106 comprises a backup system for backing up data storage system 104. In some embodiments, backup data storage system 106 comprises a system for storing the state of data storage system 104 at various points in time. In some embodiments, backup data storage system 106 stores the state of data storage system 104 at regular intervals. In various embodiments, regular intervals comprise every hour, every day, three times a week, once a week, once a month, or any other appropriate interval. In some embodiments, backup data storage system 106 comprises a deduplicating storage system. In some embodiments, data storage system 104 and backup data storage system 106 each have a limited storage capacity (e.g., limited by how much physical storage capacity has been installed). In various embodiments, data storage system 104 comprises magnetic data storage, optical data storage, solid-state data storage, phase change data storage, or any other appropriate kind of data storage. In various embodiments, backup data storage system 106 comprises magnetic data storage, optical data storage, solid-state data storage, phase change data storage, or any other appropriate kind of data storage. In some embodiments, backup data storage system 106 comprises a write-once data storage system. In some embodiments, backup data storage system 106 comprises an archiving data storage system. In some embodiments, backup data storage system 106 comprises a system for efficiently estimating compression ratio in a deduplicating file system. In some embodiments, data storage system 104 comprises a system for efficiently estimating compression ratio in a deduplicating file system. In some embodiments, backup data storage 106 comprises a deduplicating system for backing up data (e.g., data stored on data storage system 104) and it is necessary to determine whether the data to be stored on backup system 106 will fit within its capacity before beginning the data backup.

Figure 2:
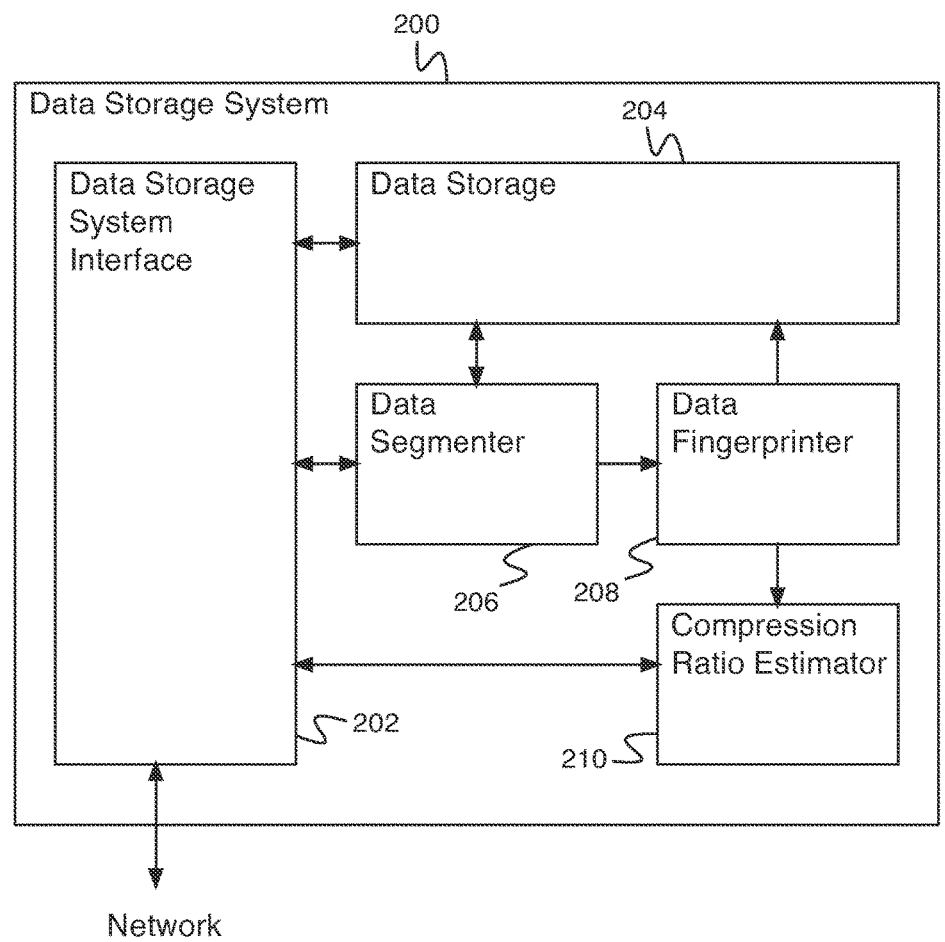
FIG. 2 is a block diagram illustrating an embodiment of a data storage system.

FIG. 2 is a block diagram illustrating an embodiment of a data storage system. In some embodiments, data storage system 200 comprises data storage system 104 of FIG. 1. In some embodiments, data storage system 200 comprises backup data storage system 106 of FIG. 1. In some embodiments, data storage system 200 comprises a system for efficiently estimating compression ratio in a deduplicating file system. In the example shown, data storage system 200 comprises data storage system interface 202. In some embodiments, data storage system interface 202 comprises a system for communicating with a network (e.g., network 100 of FIG. 1). Data storage system 200 additionally comprises data storage 204. In various embodiments, data storage 204 comprises magnetic data storage, optical data storage, solid-state data storage, phase change data storage, or any other appropriate kind of data storage. In some embodiments, data storage 204 comprises a deduplicating storage system. In some embodiments, a deduplicating storage system stores a reference to a stored segment in the event that a segment is already stored. In some embodiments, a deduplicating storage system stores meta information for reconstructing the data set from a set of segments. In some embodiments, data storage 204 comprises a system for storing data segments and data segment identifiers. In the example shown, data storage system 200 additionally comprises data segmenter 206. In some embodiments, data segmenter 206 comprises a system for processing an incoming stream of data. In some embodiments, data segmenter 206 comprises a system for producing a set of output data segments. In various embodiments, data segmenter 206 processes an incoming stream of data into a set of segments of identical size, of approximately identical size, using randomized boundaries, using boundaries determined by a hash function, or using boundaries determined in any other appropriate way. In the example shown, data storage system 200 additionally comprises data fingerprinter 208. In some embodiments, data fingerprinter 208 comprises a system for processing a set of data segments (e.g., a set of data segments produced by data segmenter 206). In some embodiments, data fingerprinter 208 comprises a system for producing a set of data segment identifiers. In various embodiments, data fingerprinter 208 produces a set of data segment identifiers from a set of data segments using a hash function, using a randomized function, using truncation, using data subsampling, or in any other appropriate way. In some embodiments, a data segment identifier comprises a fingerprint of the segment.

In the example shown, data storage system 200 additionally comprises compression ratio estimator 210. In some embodiments, data storage system 200 comprises a system for efficiently estimating compression ratio in a deduplicating file system. In some embodiments, compression ratio estimator 210 exists as a software module executing on computer accessed by a data storage system user (e.g., data storage system user 102 of FIG. 1). In some embodiments, compression ratio estimator 210 exists as a standalone system communicating with a data storage system user (e.g., data storage system user 102 of FIG. 1) and a data storage system (e.g., data storage system 104 of FIG. 1). In some embodiments, compression ratio estimator 210 comprises a system for processing a set of segment identifiers (e.g., a set of segment identifiers produced by data fingerprinter 208). In some embodiments compression ratio estimator 210 comprises a system for estimating a quantity of unique identifiers.

Figure 3:
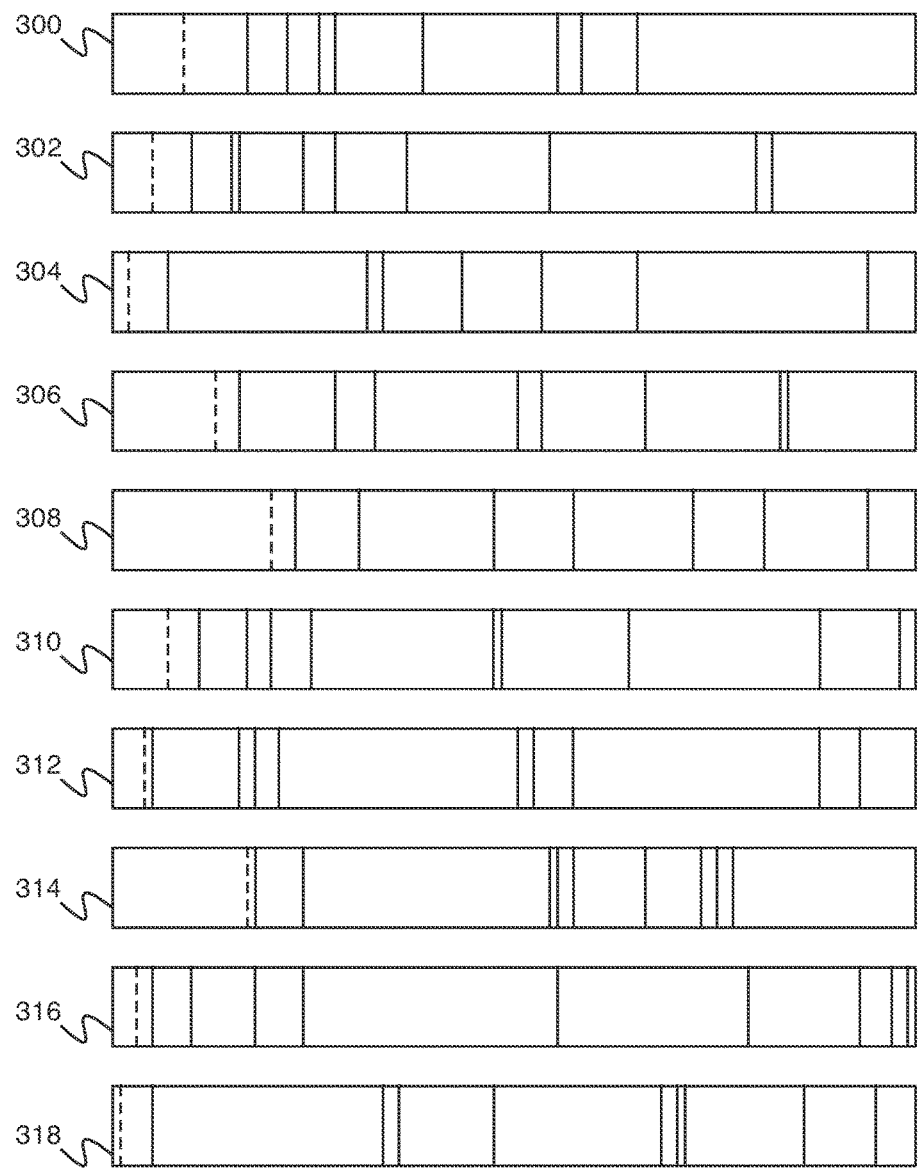
FIG. 3 is a diagram illustrating an embodiment of a set of random trials.

FIG. 3 is a diagram illustrating an embodiment of a set of random trials. In the example shown, ten random trials are shown. In the example shown, each random trial shows the position of ten random variables uniformly distributed within the interval 1 to 100 (inclusive). In some embodiments, the random trials of FIG. 3 illustrate the output of a randomizing hash function associating a set of ten identifiers into an ordered set of bins numbered from 1 to 100. The ten random numbers will partition the space of 100 ordered bins into 11 partitions, yielding an average partition size of 9.1. In the example shown, each random variable output is shown with a line, and the minimum random variable for each trial is shown with a dashed line. In the event multiple random variables were chosen to be the same number within the same trial, only a single line is shown. In the random trial 300, the minimum chosen value is 9. In the random trial 302, the minimum chosen value is 5. In the random trial 304, the minimum chosen value is 2. In the random trial 306, the minimum chosen value is 13. In the random trial 308, the minimum chosen value is 20. In the random trial 310, the minimum chosen value is 7. In the random trial 312, the minimum chosen value is 4. In the random trial 314, the minimum chosen value is 17. In the random trial 316, the minimum chosen value is 3. In the random trial 318, the minimum chosen value is 1. The average of the minimum values of chosen values is 8.1, providing an estimate of the ideal average partition size of 9.1. An estimate of the number of random variables can be made using average minimum value, by computing (number of bins)/(average minimum value)−1=11.3. The error of this estimate is on the order of $1/\sqrt{k}$, where k is the number of trials performed. As the number of random trials increases, the accuracy increases, dropping below 1% error when 10000 tests are performed. In the example shown, for an estimate made with 10 trials, the expected error is 31.6%. The computed estimate has an error of 13%, falling well within our error bound.

In the example shown, the diagram of FIG. 3 illustrates an additional advantage of the system for efficiently estimating compression ratio in a deduplicating file system. For each trial, a hash function of each identifier is computed, however, only a single value is stored, the minimum value returned by the hash function (e.g., the random number drawn with a dotted line for each trial of FIG. 3). This remains true regardless of the number of identifiers being processed. As the trials progress, a second value is stored, a running average of the minimum values computed (or a sum of the minimum values for each trial, to later be divided by the number of trials to compute the average). Thus the data storage required by the system is minimal and constant as the number of identifiers and trials grows. The system does not require any disk access other than what is required to receive the identifiers, as the extremely small memory usage can easily be stored in a high speed solid-state memory. The total number of computations grows only proportionally to the number of identifiers and number of trials, as opposed to with the square of the number of identifiers for a system that records each unique identifier and checks the list with each later received identifier.

Figure 4:
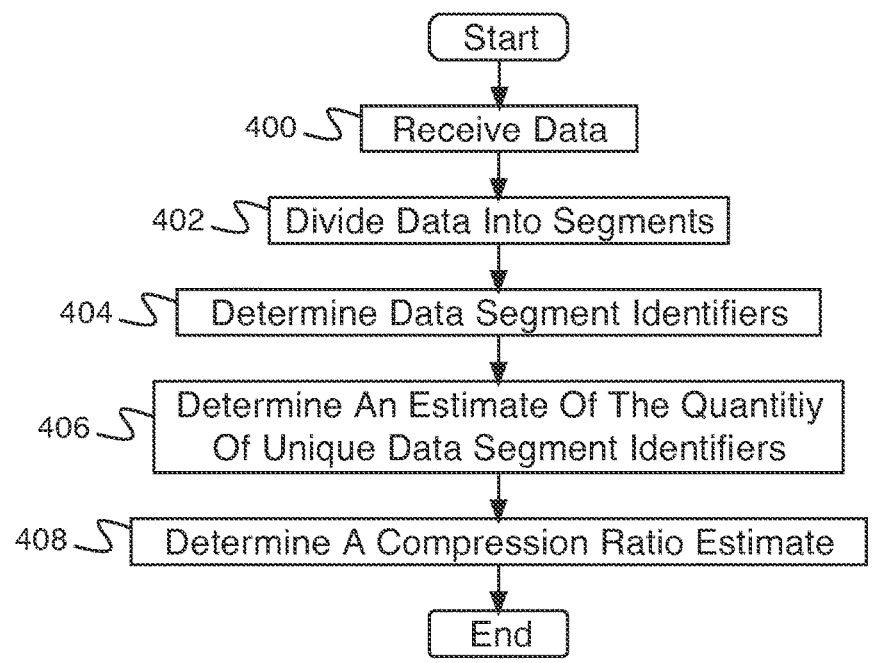
FIG. 4 is a flow diagram illustrating an embodiment of a process for efficiently estimating a compression ratio in a deduplicating file system.

FIG. 4 is a flow diagram illustrating an embodiment of a process for efficiently estimating a compression ratio in a deduplicating file system. In some embodiments, the process of FIG. 4 is executed by data storage system 200 of FIG. 2. In the example shown, in 400, data is received. In some embodiments, data is received from a different data storage device (e.g., over a network such as network 100 of FIG. 1). In some embodiments, data is received from a storage device existing as part of the system executing the process of FIG. 4 (e.g., data storage 204 of FIG. 2). In some embodiments, received data is desired to be stored in a deduplicating storage system. In 402, the data is divided into segments (e.g., by data segmenter 206 of FIG. 2). In various embodiments, the data is divided into a set of segments of identical size, of approximately identical size, using randomized boundaries, using boundaries determined by a hash function, or using boundaries determined in any other appropriate way. In 404, data segment identifiers are determined (e.g., by data fingerprinter 208 of FIG. 2). In various embodiments, data segment identifiers are determined from a set of data segments using a hash function, using a randomized function, using truncation, using data subsampling, or in any other appropriate way. In 406, an estimated of the quantity of unique data segment identifiers is determined. In various embodiments, an estimate of the quantity of unique data segment identifiers is determined using a list of data segment identifiers, using a filter, using hash functions, or in any other appropriate way. In 408, a compression ratio estimate is determined. In some embodiments, the compression ratio estimate is determined by dividing the quantity of unique data segment identifiers determined in 406 by the total number of data segment identifiers determined in 404. In some embodiments, an estimate of a required storage space is determined. In some embodiments, determining a required storage space comprises multiplying the received data (e.g., data received in 400) by the compression ratio estimate. In some embodiments, an estimate of a required storage space is determined based at least in part on the estimate of the quantity of unique identifiers. In some embodiments an error in the estimate of the quantity of unique identifiers is determined. In some embodiments, an estimate of a required storage space is determined based at least in part on the error in the estimate of the quantity of received identifiers.

Figure 5:
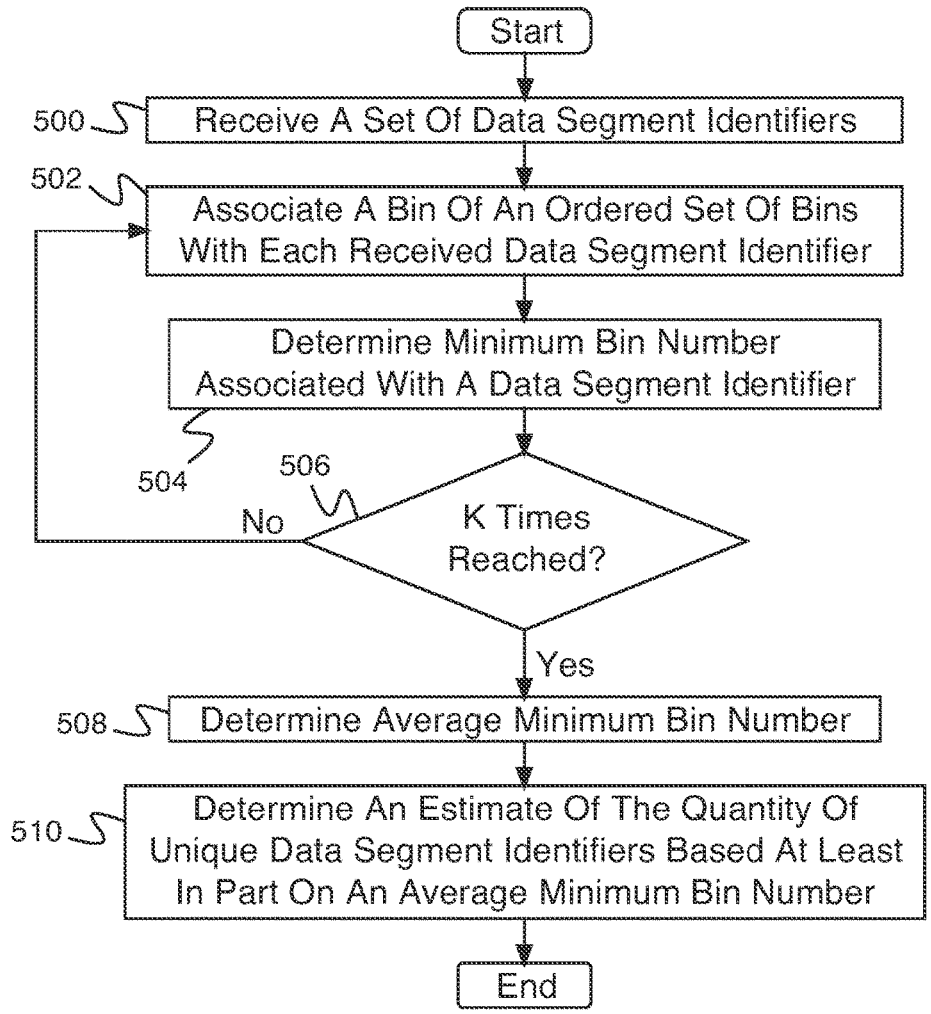
FIG. 5 is a flow diagram illustrating an embodiment of a process for determining an estimate of a quantity of unique data segment identifiers.

FIG. 5 is a flow diagram illustrating an embodiment of a process for determining an estimate of a quantity of unique data segment identifiers. In some embodiments, the process of FIG. 5 implements 406 of FIG. 4. In some embodiments, the process of FIG. 5 is executed by compression ratio estimator 210 of FIG. 2. In the example shown, in 500, a set of data segment identifiers is received (e.g., from data fingerprinter 208 of FIG. 2). In some embodiments, each received identifier comprises one of a plurality of identifiers determined from a segment of a set of segments (e.g., segments determined by data segmenter 206 of FIG. 2). In some embodiments, the set of segments comprise segments determined from a data set desired to be stored by a deduplicating storage system. In some embodiments, the deduplicating storage system stores a reference to a stored segment in the event that a segment is already stored. In some embodiments, the deduplicating storage system stores meta information for reconstructing the data set from the set of segments. In some embodiments, the received data segment identifier comprises a fingerprint of the segment. In 502, a bin of an ordered set of bins is associated with each received data segment identifier. In some embodiments, a bin of an ordered set of bins is associated with each received data segment identifier using a hash function. In some embodiments, a bin of an ordered set of bins is associated with each received data segment identifier for each of the k times using one hash function of k hash functions. In some embodiments, each of the k hash functions is selected to distribute a set of input values evenly across the ordered set of bins. In some embodiments, the bin associated with each received identifier has a number identifying its place in the ordered set of bins. In 504, a minimum bin number associated with a data segment identifier is determined. In some embodiments, the minimum bin number associated with a data segment identifier is determined by comparing the bin numbers associated with the data segment identifiers and selecting the minimum bin number. In some embodiments, a minimum bin number is determined associated with received data segment identifiers for each of the k times. In some embodiments, the minimum bin number comprises a lowest bin number with an associated bin for a received identifier. In 506 it is determined whether a bin of an ordered set of bins has been associated with each data segment identifier k times. If it is determined that a bin of an ordered set of bins has not been associated with each data segment identifier k times, control passes to 502. If it is determined that a bin of an ordered set of bins has been associated with each data segment identifier k times, control passes to 508. In 508, the average minimum bin number is determined. In some embodiments, the average minimum bin number is determined by averaging the minimum bin numbers (e.g., the minimum bin numbers determined in 504). In some embodiments, the minimum bin number is averaged for each of the k times to determine the average bin number. In 510, an estimate of the quantity of unique data segment identifiers is determined based at least in part on an average minimum bin number. In some embodiments, the quantity of unique data segment identifiers is determined by dividing the number of bins in the ordered set of bins (e.g., the set of bins one of which is associated with each received data segment identifier in 502) by the average minimum bin number (e.g., the average minimum bin number determined in 508) and subtracting one. In some embodiments, an estimate of a required storage space is determined based at least in part of the estimate of the quantity of unique identifiers. In some embodiments, an error in the estimate of the quantity of unique identifiers is determined. In some embodiments, the error is based at least in part on k. In some embodiments, an estimate of a required storage space is determined based at least in part on the error in the estimate of the quantity of unique identifiers.

Figure 6:
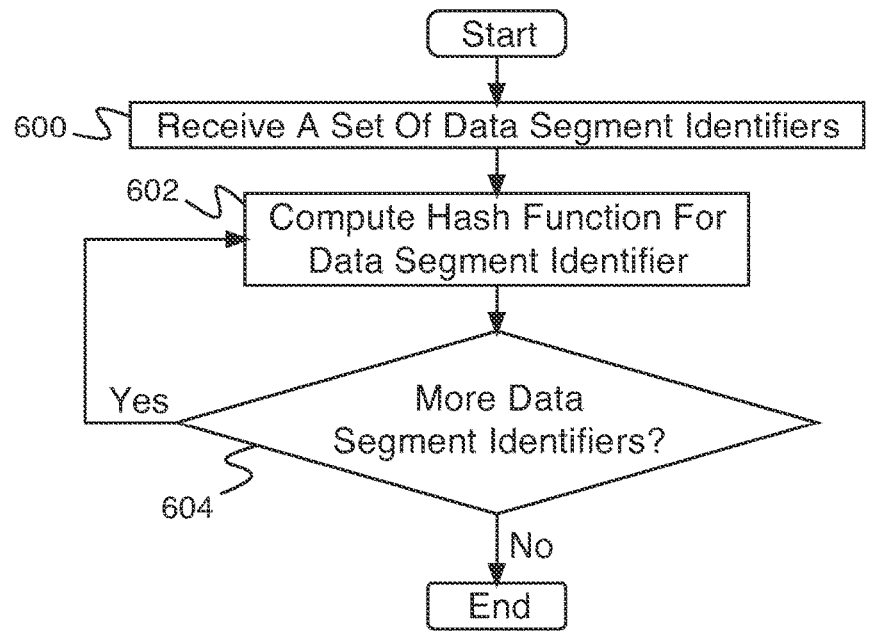
FIG. 6 is a flow diagram illustrating an embodiment of a process for associating a bin of a set of bins with each received data segment identifier.

FIG. 6 is a flow diagram illustrating an embodiment of a process for associating a bin of a set of bins with each received data segment identifier. In some embodiments, the process of FIG. 6 implements 502 of FIG. 5. In the example shown, in 600, a set of data segment identifiers is received. In some embodiments the set of data segment identifiers received in 600 comprises the set of data segment identifiers received in 500 of FIG. 5. In 602, a hash function is computed for a data segment identifier. In some embodiments, the hash function comprises a randomized hash function. In 604, it is determined if there are more data segment identifiers. If there are more data segment identifiers, control passes to 602. If there are not more data segment identifiers, the process ends.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A deduplicating storage system, comprising:
   a processor configured to:
   for each of k times: associate a bin of an ordered set of bins with each received identifier, wherein each bin in the ordered set of bins has a bin number and each received identifier comprises a fingerprint of a segment of a set of segments stored on a file system of the deduplicating storage system;
   determine a minimum bin number associated with each received identifier, the minimum bin number being the bin number that is minimum among the bins associated with the each received identifier;
   repeat the k times of associating a bin with a received identifier for n trials, where n is greater than two;
   determine an estimate of a quantity of unique identifiers based at least in part on an average of the minimum associated bin number;
   determine a data compression ratio of the segments stored in the file system of the deduplicating storage system based on the estimated quantity of the unique identifiers without having to record a list of the unique identifiers and check the list of the unique identifiers for the each received identifier;
   determine a capacity of the deduplicating storage system; and
   back up data to the system of the deduplicating storage system based on the determined capacity of the deduplicating storage system and the determined data compression ratio of the segments stored therein; and
   a memory coupled to the processor and configured to provide the processor with instructions.

2. A system as in claim 1, wherein the bin of the ordered set of bins is associated with each received identifier for each of the k times using one hash function of k hash functions.

3. A system as in claim 2, wherein each of the k hash functions is selected to distribute a set of input values evenly across the ordered set of bins.

4. A system as in claim 1, wherein the bin associated with each received identifier has a number identifying the bin's place in the ordered set of bins.

5. A system as in claim 4, wherein a minimum bin number is determined associated with received identifiers for each of the k times.

6. A system as in claim 5, wherein the minimum bin number comprises a lowest bin number with an associated bin for a received identifier.

7. A system as in claim 5, wherein the minimum bin number is averaged for each of the k times to determine an average bin number.

8. A system as in claim 1, wherein determining the estimate of the quantity of unique identifiers comprises dividing a total number of bins by an average minimum associated bin value and subtracting one.

9. A system as in claim 1, wherein each received identifier comprises one of a plurality of identifiers determined from a segment of the set of segments.

10. A system as in claim 9, wherein the set of segments comprise segments determined from a data set desired to be stored by the deduplicating storage system.

11. A system as in claim 10, wherein the deduplicating storage system stores a reference to a stored segment in the event that a segment is already stored.

12. A system as in claim 10, wherein the deduplicating storage system stores meta information for reconstructing the data set from the set of segments.

13. A system as in claim 9, wherein the received identifier comprises a fingerprint of the segment.

14. A system as in claim 1, wherein an estimate of a required storage space is determined based at least in part on the estimate of the quantity of unique identifiers.

15. A system as in claim 1, wherein an error in the estimate of the quantity of unique identifiers is determined.

16. A system as in claim 15, wherein the error is based at least in part on k.

17. A system as in claim 15, wherein an estimate of a required storage space is determined based at least in part on the error in the estimate of the quantity of unique identifiers.

18. A method for data backup based on estimates of a quantity of unique identifiers in a deduplicating storage system comprising:
   for each of k times: associating a bin of an ordered set of bins with each received identifier, wherein each bin in the ordered set of bins has a bin number and each received identifier comprises a fingerprint of a segment of a set of segments stored on a file system of the deduplicating storage system;
   determining, using a processor, a minimum bin number associated with each received identifier, the minimum bin number being the bin number that is minimum among the bins associated with the each received identifier;
   repeating the k times of associating a bin with a received identifier for n trials, where n is greater than two;
   determining an estimate of a quantity of unique identifiers based at least in part on an average minimum associated bin number;
   determining a data compression ratio of the segments stored in the file system of the deduplicating storage system based on the estimated quantity of the unique identifiers without having to record a list of the unique identifiers and check the list of the unique identifiers for the each received identifier;
   determining a capacity of the deduplicating storage system; and
   backing up data to the file system of the deduplicating storage system based on the determined capacity of the deduplicating storage system and the determined data compression ratio of the segments stored therein.

19. The method of claim 18, wherein the bin associated with each received identifier has a number identifying the bin's place in the ordered set of bins.

20. The method of claim 18, wherein determining the estimate of the quantity of unique identifiers comprises dividing a total number of bins by an average minimum associated bin value and subtracting one.

21. A computer program product, the computer program product being embedded in a non-transitory computer readable storage medium and comprising computer instructions for performing a method for data backup based on estimates of a quantity of unique identifiers in a deduplicating storage system comprising:
   for each of k times: associating a bin of an ordered set of bins with each received identifier, wherein each bin in the ordered set of bins has a bin number and each received identifier comprises a fingerprint of a segment of a set of segments stored on a file system of the deduplicating storage system;
   determining, using a processor, a minimum bin number associated with each received identifier, the minimum bin number being the bin number that is minimum among the bins associated with the each received identifier;

repeating the k times of associating a bin with a received identifier for n trials, where n is greater than two;

determining an estimate of a quantity of unique identifiers based at least in part on an average minimum associated bin number;

determining a data compression ratio of the segments stored in the file system of the deduplicating storage system based on the estimated quantity of the unique identifiers without having to record a list of the unique identifiers and check the list of the unique identifiers for the each received identifier;

determining a capacity of the deduplicating storage system; and backing up data to the file system of the deduplicating storage system based on the determined capacity of the deduplicating storage system and the determined data compression ratio of the segments stored therein.

22. The computer program product of claim 21, wherein the bin associated with each received identifier has a number identifying the bin's place in the ordered set of bins.

23. The computer program product of claim 21, wherein determining the estimate of the quantity of unique identifiers comprises dividing a total number of bins by an average minimum associated bin value and subtracting one.

* * * * *